United States Patent [19]

Harris

[11] 4,114,661

[45] Sep. 19, 1978

[54] MOBILE FLUID TREATMENT TANK SERVICING APPARATUS

[76] Inventor: James A. Harris, 11608 Modoc, Ventura, Calif. 93003

[21] Appl. No.: 749,328

[22] Filed: Dec. 10, 1976

Related U.S. Application Data

[63] Continuation of Ser. No. 570,830, Apr. 23, 1975, abandoned, and a continuation-in-part of Ser. No. 382,672, Jul. 26, 1973, Pat. No. 3,880,212.

[51] Int. Cl.² .............................................. B65B 3/04
[52] U.S. Cl. ................................................... 141/231
[58] Field of Search ............... 134/169 R; 141/1, 4–7, 141/9, 59, 84, 85, 89–92, 98–105, 231, 285, 44, 18, 2; 137/1, 15; 222/176, 177, 178

[56] References Cited

U.S. PATENT DOCUMENTS

3,880,212  4/1975  Harris .................................. 141/231

Primary Examiner—Houston S. Bell, Jr.
Attorney, Agent, or Firm—Blakely, Sokoloff, Taylor & Zafman

[57] ABSTRACT

Mobile apparatus for servicing fluid treatment equipment of the type having a removable solid material therein, such as water softener service tanks. For water softener service tanks, the mobile apparatus includes a first tank for holding reactivated resin, a second for holding used resin, apparatus for receiving at least one service tank to be serviced, and various flow inducing and control apparatus to remove the used resin from the service tank and replace it with reactivated resin. The mobile apparatus may also include apparatus for reactivating the used resin overnight so that a truckload of used resin at the end of a working day may be reactivated for use the next day. Methods and apparatus for removing the resin through the top of a service tank without turning the tank over are disclosed.

33 Claims, 13 Drawing Figures

MOBILE FLUID TREATMENT TANK SERVICING APPARATUS

This is a continuation of application Ser. No. 570,830 filed Apr. 23, 1975, now abandoned, and a continuation-in-part of application Ser. No. 382,672 filed July 26, 1973. now U.S. Pat. No. 3,880,212.

BACKGROUND OF THE INVENTION

1. Field of the Invention

The present invention relates to the field of water conditioner servicing equipment.

2. Prior Art

In recent years water conditioning equipment has found widespread use in both commercial and residential applications. In most installations the equipment is intended for removal of minerals from the water though other equipment, such as by way of example, equipment for deionization of water is also known. The mineral removal type of water conditioning system, more commonly referred to as water softeners, are generally characterized by a tank filled with a special resin, with the tank having connections thereto so that water may be caused to flow through the resin without allowing the resin to escape. These tanks, which shall be referred to herein as the service tanks, are generally connected in series with a house water line; either the water line supplying the water heater if only hot soft water is desired, or in series with the entire house water supply if both hot and cold soft water are desired.

The service tanks generally are characterized by some form of quick disconnect for the inlet and outlet thereto so that the service tanks may be quickly removed and exchanged at the service site (home) by a serviceman.

The typical water softening process is actually an ion exchange process: used resin may be reactivated by flushing with a brine solution which removes the calcium and other minerals from the resin in exchange for sodium ions. When the water to be used in a home is run through the activated resin, the sodium ions are exchanged for calcium and other minerals in the water until the resin is in need of further reactivation as a result of contamination of the resin with the minerals. The resin itself is a granular material which is not water soluble and which may be retained by suitable scree-like devices and re-used essentially indefinitely by periodic reactivation, subject only to some loss due to spilling, crushing of the granules so that they will pass through the screens, etc.

In the prior art there are two basic methods of servicing the service tanks, that is, going from a service tank with resin therein in need of activation to a service tank having activated resin therein. These two methods have certain characteristics in common, by way of example, with both methods service tanks are returned to a central plant for reactivation. Accordingly, a serviceman or route man starts a particular route with a service truck loaded with reactivated service tanks, and at each service site exchanges the used service tank with a reactivated service tank so that at the end of the route the truck will be loaded with service tanks in need of reactivation. The truck then returns to the central plant and the used service tanks are removed from the truck.

In one method of reactivating the service tanks, each service tank is connected to a back-wash apparatus whereby water may be caused to flow through the service tank in the reverse direction with the resin therein being expanded as a result of the free separation of the granules to allow the water flow therebetween, the granules being retained by gravity in the lower portion of an open top container above each service tank so that excess water may flow over the top of the tank with the resin expanding only to a level below the top of the tank with the resin generally returning to the tank when the back flow is stopped (though in practice the equipment generally used often requires mechanical encouragement of the resin for complete return to the service tank). In essence, the resin temporarily removed from a particular service tank during this process is returned to the tank upon regeneration, and in fact, not all of the resin is removed from the tank during back wash but is merely expanded as a result of the back flow. Next, a brine solution regeneration, soft water rinse, and chlorinated water sterilization of the tank and resin completes the regeneration.

The other main method for servicing the service tank is to invert the service tank and pour out the resin into a central vat, whereby the resin may be reactivated in bulk and then returned to the service tanks to complete the process.

Both of these methods have certain characteristics with respect to equipment and manual operation which makes the overall operation quite expensive in comparison to the actual resin regeneration process itself. By way of example, for each truck there must be a full truckload of service tanks, a "float" of tanks in the regeneration plant being processed for the next day, plus extras for occasional replacement of defective tanks, by way of extra service tank inventory. This investment in inventory service tanks is very substantial even in comparison with the cost of the trucks themselves. Also, there is a great deal of hand labor in loading and unloading the trucks at the plant as a service tank, whether filled with used resin or reactivated resin, has a weight typically in the area of one-hundred fifty pounds or more and must be manually removed from and returned to the truck as well as manually or semi-manually dumped or attached to the regeneration equipment, depending on which method is used. Unloading and loading the truck at the end of the day may require as much as two hours, thereby decreasing the effective routine time in an ordinary working day and typing-up a great deal of equipment while doing so. Plant operators are normally required to assure proper regeneration of the service tank, etc. Consequently, with the prior art method there is a very substantial investment in equipment and extra service tanks, there is a large amount of manual labor required for the moving of service tanks and the loading and unloading of the trucks at the plant, and a permanent plant of substantial size is required to house the regeneration equipment and the like.

In my copending application I have disclosed a new and unique mobile system for accomplishing the required task, for which the present invention is an extension:

BRIEF SUMMARY OF THE INVENTION

Mobile apparatus for servicing fluid treatment equipment of the type having a removable solid material therein, such as water softener service tanks. For water softener service tanks, the mobile apparatus includes a first tank for holding reactivated resin, a second tank for holding used resin, apparatus for receiving at least one service tank to be serviced, and various flow inducing and control apparatus to remove the used resin from the service tank and replace it with the activated resin. One of the first and second tanks may be provided with internal manifolds, etc. so that the used resin may be reactivated therein. The two tanks are characteristically operated in a partial filled condition. Operation of the system is substantially automatic, with the servicing of a service tank being accomplished in a matter of minutes. Methods and apparatus for removing the resin through the top of a service tank are also disclosed.

DETAILED DESCRIPTION OF THE INVENTION

Figure 1:
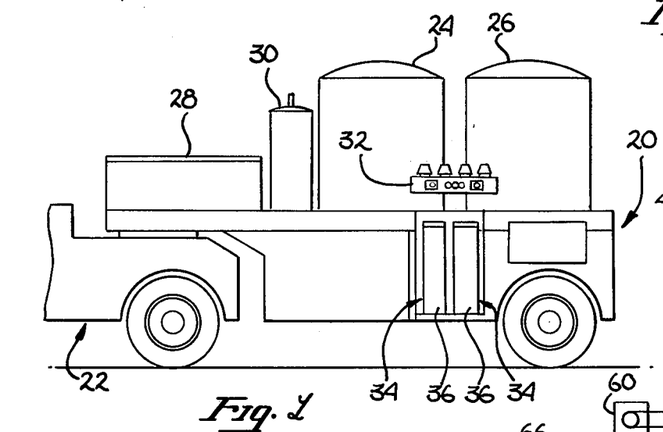
FIG. 1 is a side view of a trailer comprising one embodiment of the present invention.

First referring to FIG. 1, a side view of a preferred embodiment of the present invention may be seen. The apparatus is built into a trailer 20, which is designed to couple to a conventional tractor 22 to provide a relatively short, highly maneuverable tractor-trailer combination to easily service water softener tanks in residential neighborhoods. The trailer is characterized as having a pair of large tanks 24 and 26 with a compartment 28 forward of those tanks, and perhaps with a smaller tank 30 therebetween. The compartment 28 in the preferred embodiment houses an auxiliary engine for supplying the required power to the various fluid pumping mechanisms and control devices for the system. Also mounted to the side of the vehicle is an assembly 32 comprising a pair of tank coupling systems, with a pair of service tank lift devices generally in the area 34 for receiving and lifting service tanks from the ground into position against the assembly 32.

Figure 1A:
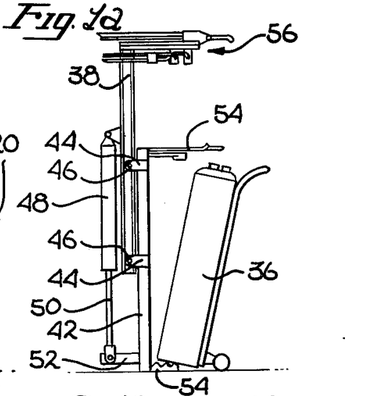
FIG. 1a is a side view of the lifting assembly for service tanks on the trailer of FIG. 1.

Greater details of the lifting assembly 34 are shown in FIG. 1A, which is a side view of the apparatus. In particular, for each of the lifting assemblies there is an I-beam member 38 fastened to the side of the trailer 40, with a second box member 42 disposed immediately in front of the I-beam member 38. A pair of brackets 44 welded to each side of the box member 42 support rollers 46 fitting within the channel defined by the side of the I-beam so as to provide a freely sliding assembly between box member 42 and the I-beam member 38. A cylinder assembly 48 drives a piston rod 50 attached adjacent the bottom of the box member 42 by arm 52. Outwardly projecting from the bottom of box 42 are a pair of support brackets 54 which may receive the lower edge of a service tank 36. The top portion of the tank 36 is retained in the desired vertical position by a clamp assembly 54, the specific details of which will vary depending upon which type of service tank the system is adapted to be used with. Aslo adjacent the top of the assembly are the couplings 56 which provide the desired fluid coupling to the service tank 36 when it is lifted to the upper position by control of the piston cylinder assembly.

Water softener service tanks vary in design from company to company. By way of example, service tanks used by Culligan are characterized as having two fluid connections, the first being a connection threaded through the top of the tank and projecting downward adjacent the inside bottom thereof. This connection has a screen or filter-like element at the bottom thereof so as to allow the flow of water from the bottom of the tank into the connection while simultaneously restricting and preventing a similar flow of resin commonly used in such tanks. The second connection also projects through the top wall of the tank. This removable screen is trapped by the quick disconnect connection used to couple the tank to a home, but may be readily removed from this connection when the tank is uncoupled from the water system awaiting servicing. For reference, in the description of the present invention to follow, the member which mates with the tank connection having a screen therein shall be labeled the A coupling, whereas the member which couples with the connection not having a screen at the bottom thereof shall be identified as the B connection. Obviously the specific details and the manner in which these connections are made between the service tank and the apparatus of the present invention will vary depending upon the specific type of tank being used. By way of specific example, with respect to the Culligan service tanks, the connections may be made by a simple pressure system, that is, raising the tank vertically until mating the two connections directly above the assembly 32, with the fluid coupling being made substantially leakproof by a rubber sealing member on the assembly 32 (FIG. 1). Also it will be obvious that for other types of connection which may not be made in quite as simple a manner, the connection may always be made using means essentially duplicating that which will be found at the house itself, with such means perhaps being supported by flexible hoses so that it may be readily mated with the service tank, rather than requiring the service tank to be jockeyed into position to mate with a stationary connection. In fact, complete servicing of the tank may be done without lifting the tank from the ground, with the tank being returned to the same installation after being serviced. Finally, even servicing at the installation though hoses from the truck or trailer is possible, and may be preferred depending on the distances and service tank sizes.

Figure 6:
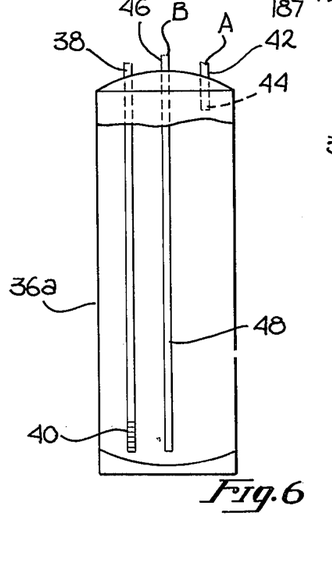
FIG. 6 is a side partial cross-sectional view of a service tank having three fluid connections thereto.
Figure 7:
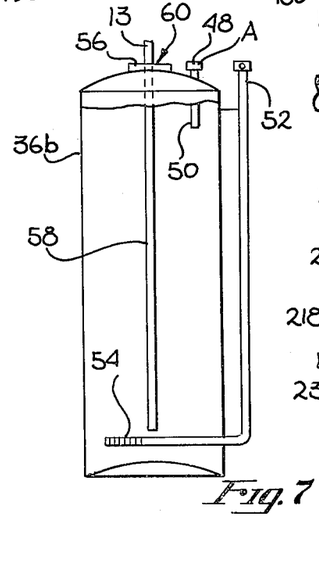
FIG. 7 is a side partial cross-sectional view of a service tank illustrating the use of a drop tube.

Two other types of tanks are shown in FIGS. 6 and 7. FIG. 6 shows a tank 36a having three connections, the first connection 38 has a fixed screen 40 on the bottom thereof, with the second connection 42 having a screen 44 adjacent the top of the tank. In this regard this tank is very similar to the Culligan tank, and in fact may be a Culligan tank, with screen 44 being readily removable thru connection 42 when the tank is not coupled to the house water supply. However, this tank includes a third connection 46 not found in any prior art tank which is a connection communicating thru tube 48 to a position adjacent the bottom of the tank. This connection does not have a screen in it, and except for servicing service tanks is generally to be capped off or sealed when the tank is attached to the home.

The tank shown in FIG. 7 is an illustration of the tank utilized by Servi-soft and Rayne companies. This type of tank has a connection 48 having a fixed screen 50 thereon, and a second connection 52 extending down the side of the tank and thru the sidewall adjacent the bottom thereof to a fixed screen 54. There is also provided a rather large cap area 56 into which a sealing cap is normally threaded while the tank is being serviced. This cap is intended for quick removal so that the tank may be inverted to dump out the resin therein. However, in the present invention there is provided a pipe 58 having a mating threaded region, generally indicated by the numeral 60, so that the pipe 58 may be threaded into position to provide what is referred to herein as a drop tube 58, that is, a tube having an opening adjacent the bottom region of the tank. With respect to the tanks of FIGS. 6 and 7, the A connection and B connection are identified therein. For the tank of FIG. 7 connection 52 may be sealed off while the tank is being serviced with the equipment of the present invention.

Figures 2, 3:
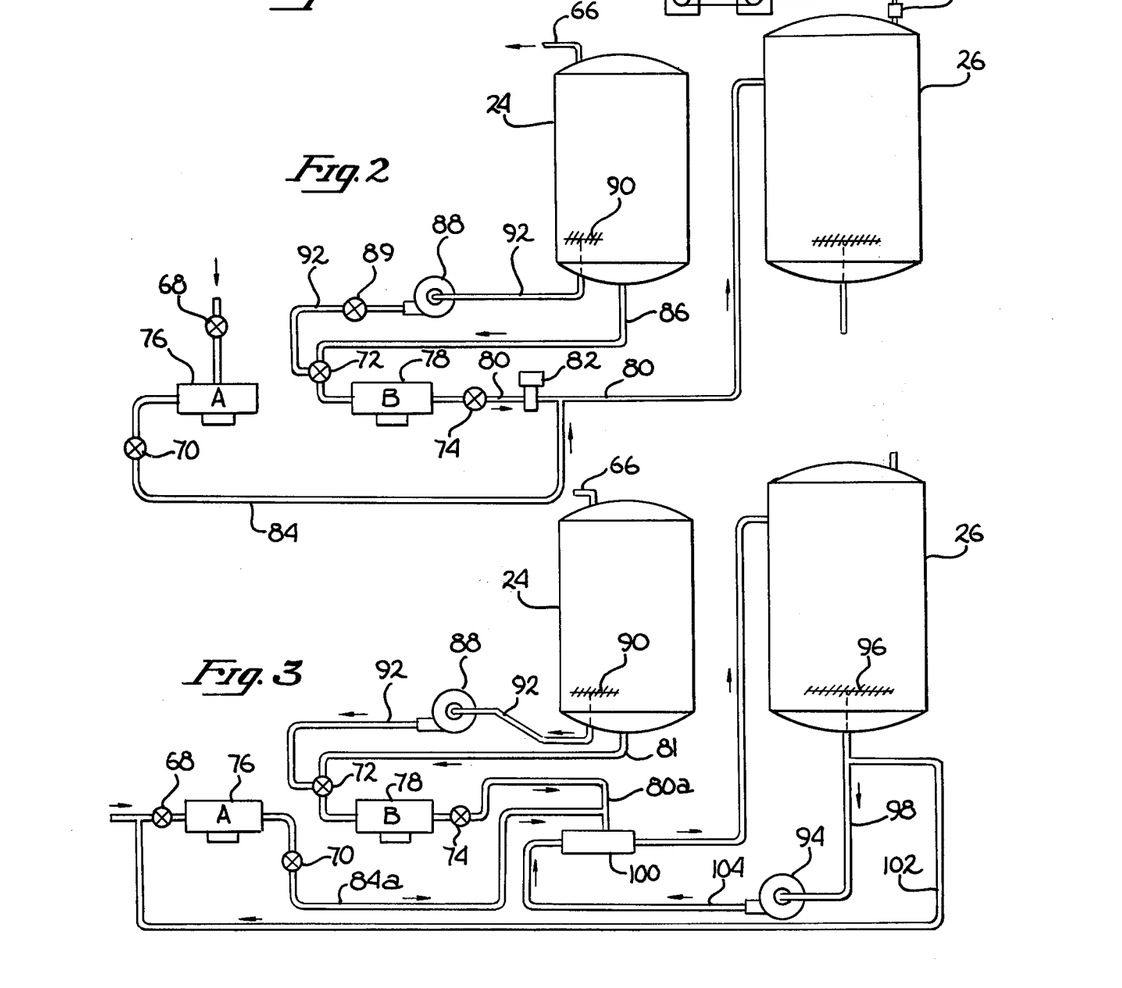
FIG. 2 is a schematic representation of one embodiment of the present invention.
FIG. 3 is a schematic representation of a second embodiment of the present invention.

Now referring to FIG. 2. One embodiment of the present invention may be seen. In this embodiment the auxiliary engine 60 drives a vacuum pump 62 which maintains a vacuum on tank 26 through a check valve 64. Tank 24 in turn is vented to the atmosphere, schematically illustrated by the vent 66. Tank 24 is utilized to store regenerated resin, with resin being removed from the service tanks 36 being stored in tank 26. Either of tanks 24 or 26 may include apparatus for regenerating the resin so that the trailer is substantially entirely self-contained, or in the alternative the resin may be removed from tank 26 at the end of the day and regenerated in a batch processing plant for return to tank 24. Thus, as described in my copending application, typically the larger tank 26 would contain the internal manifolding required for regeneration, and there would be some pump or other means provided for transferring the regenerated resin from the tank 26 to the tank 24 (if a batch processing system were used, common couplings and pumping devices well known in the art would be incorporated for this purpose).

At the beginning of the day tank 26 would be empty and tank 24 would be substantially filled with regenerated resin and water, preferably with the water level being somewhat higher than the resin level (e.g., a certain percentage of excess water).

The system of FIG. 2 includes four electrically operated solenoid valves 68, 70, 72 and 74. These valves control the flow of the water-resin mix so as to remove the water and resin in a service tank for dumping into tank 26, and to refill the service tank with reactivated resin and water from tank 24, all encouraged by the vacuum which is maintained in tank 26. When a service tank is in position against the appropriate connections in the assembly 32, in particular the connections 76 and 78 in FIG. 2, the emptying of the tank is initiated by the opening of the valve 68 and 74. Valve 68 vents the A coupling 76 so air may pass into the service tank being serviced through the connection having the fixed screen thereon. With valve 74 open, resin and water are withdrawn from the service tank by the vacuum from tank 26 thru line 80 and coupling 78. If the service tank is of the type shown in FIG. 6, coupling 78 would be in communication with connection 46. If the tank is the type shown in FIG. 7, the cap 60 would be removed therefrom and a drop tube 58 placed into the tank so that the drop tube is in communication with coupling 78. In both cases the tubes inside the tank extend to a position adjacent the bottom of the tank so that the resin in the tank will be entrained by the water flow into the tube so that all resin in the tank may be removed thru the tube without exceptionally high flow rates.

The emptying of the tank 26 may be timed so that the valves 74 and 68 are closed within a few seconds of the time required to empty the tank, or in the embodiment shown a flow switch 82 may be provided which senses the flow of resin in line 80, and when that flow stops, automatically closes valves 68 and 74. The signal closing the valves may be used as an initiating signal to open the valves 70 and 72, or as an alternative a timeclock may be provided to open these valves a sufficient length of time after the emptying of the service tank was initiated to be sure that that sequence was completed. In any event, upon the opening of valves 70 and 72, the vacuum in tank 26 is communicated thru lines 80 and 84 into the service tank thru the A coupling 76. This draws the water-refreshed resin mix from tank 24 thru line 86 and valve 72 into the tank through the B connection 78. In this embodiment an extra feature is provided, in that after a sufficient time to fill the tank, a small pump 88 turns on, drawing water only thru a screen 90 in the lower portion of tank 24, through line 92, and solenoid valve 89 into the valve 72 to wash the valve of resin so that the valve will close cleanly and provide a good seal against water leakage (the valves preferably manufactured by ITT GRINNELL as their Valve 2401-3212 have flexible closure members which may fail to close in a leakproof manner if there is resin in the valve.

It will be noted that in the embodiment described with respect to FIG. 2, the service tank is filled by the encouragement of the water and resin into the service tank by the vacuum in tank 26. In practice, the water flow will slightly exceed the resin flow so that when the tank is filled with resin, slightly more than one service tank full of water will have passed into the tank, with the excess going on into tank 26. Also, when the service tank is filled, the resin flow will stop, though the water flow will continue until the valves close a short time thereafter. However, the overall flow is quite efficient, with the excess water being only a small percentage of the total volume transferred and is readily allowed for by having an initial excess of water in tank 24 as previously described. However, as a convenience, a small pump may be provided to pump water from tank 26 into tank 24 to compensate for the excess water flow, allowing an operator to minimize his initial load by not requiring excess water over the regenerated resin at the beginning of the day.

Now referring to FIG. 3, an alternate embodiment similar to the embodiment of FIG. 2 may be seen. In this embodiment, both tanks 24 and 26 are vented. In place of the propelling force of the vacuum in tank 26 is a pump 94 which pumps water only from the bottom of tank 26 through a screen 96 in line 98, into an ejector 100, such as by way of example, the ejector manufactured by PENBERTHY as their model number 65A. The ejector in turn creates a vacuum on lines 80a and 84a, as a functional equivalent to the vacuum created on line 80 and 84 in the embodiment of FIG. 2 by the vacuum in tank 26. Also, in the embodiment of FIG. 3, it is generally preferable to connect valve 68 through a line 102 to the water line coming from the bottom of tank 26 so that when valve 68 is open, coupling 76 is vented not to the atmosphere but to a low pressure supply of water. Thus, the service tank remains full of water during the entire recharging operation so that the ejector 100 is never called upon to pump air. Also, it is obvious that line 104 between pump 94 and the ejector 100 may also be coupled through a controllable valve to tank 24 so that excess water which would otherwise tend to accumulate in tank 26 may be returend to tank 24, thereby again minimizing the amount of water required in the initial load at the start of a service route.

Figure 4:
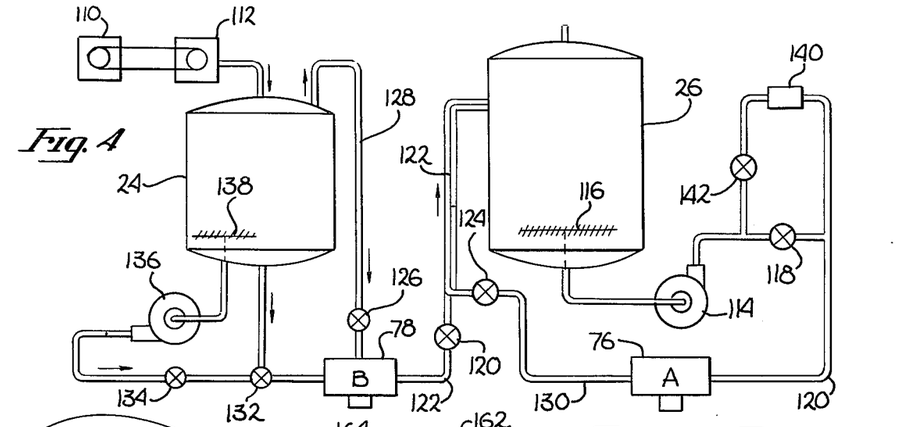
FIG. 4 is a schematic representation of a third embodiment of the present invention.

It should be noted that in the embodiment of FIG. 2, the service tank may be purged of substantially all water and resin prior to refilling with regenerated resin and water, as the tank fills with air during the used resin removal phase of the recharging cycle. Thus filters are not required in the various lines to prevent the filling of the service tank with water having particles therein fine enough to pass through the fixed screens in the tank. Another embodiment which achieves the same result is shown in FIG. 4. In this embodiment, an engine 110 drives a compressor 112 to pressurize tank 24, while tank 26 is vented to the atmosphere. For removal of resin from the service tank, pump 114 pumps water through the screen 116 on the bottom of tank 26, through valve 118 in line 121, into the A coupling 76. At the same time valve 120 is opened so that the used resin water mixture may be expelled from the service tank through the B coupling 78 and line 122 into tank 26. When the tank is empty of resin, valve 120 and 118 are closed and valves 124 and 126 are opened. This directs pressurized air through line 128 into the B coupling 78 to purge the water from the service tank through the A coupling 76, line 130, valve 124 and line 122 into tank 26. Obviously, however, line 128 and line 126 in this embodiment may be coupled to either the A or B coupling, as both couplings are connected so as to be capable of directing water that is expelled from the service tank into tank 116.

When the service tank is empty the valve 126 is closed and valves 132 and 124 are opened. The pressure in tank 24 forces the resin water mix into the service tank through the B coupling 78, with any excess water in the flow passing through the A coupling 76 and line 122 into tank 26. In the last ten seconds of this refilling operation, solenoid valve 134 is opened so that pump 136 may pump clear water from the bottom of tank 24 through screen 138 to flush the diaphram valve 132. Also in this embodiment there may be provided a flow control valve 140, with an on/off valve 142 operating in place of valve 118. Such an arrangement can be used to control the flow of flushing water into the service tank through the A coupling 76 so that, for servicing mixed media service tanks, one medium may be selectively removed from the tank by the controlled flow.

Figure 5:
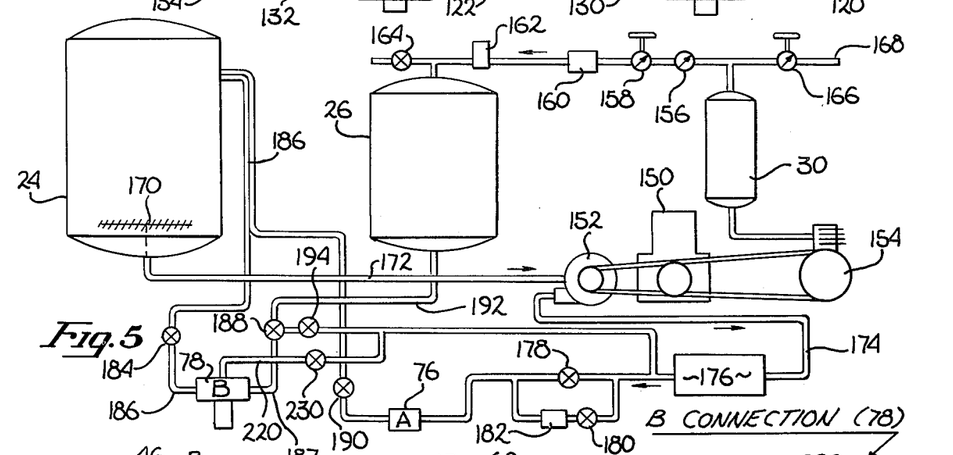
FIG. 5 is a schematic representation of a fourth embodiment of the present invention.

Now referring to FIG. 5, a further embodiment may be seen. This embodiment is much like the embodiment of my co-pending application, though it is simpler in use in that even for Culligan Service Tanks, the used resin may be substantially completely removed from the tank without inversion of the tank or use of a drop tube. In particular, an auxiliary engine 150 is provided to directly drive pump 152 and air compressor 154. The compressor 154 pressurizes tank 30 (see also FIG. 1) which in turn pressurizes tank 26 through a pressure gauge 156, a pressure regulator 158, a check valve 160 to prevent any back-flow, and a safety valve 162. A blow-off valve 164 is further provided as an extra precaution against the over pressurizing of tank 26. Also connected to tank 30 is a second pressure regulator 166 which provides a supply of pressurized air at a controlled pressure in line 168 for driving any pressure controlled valves, and in the preferred embodiment for driving the piston cylinder assemblies which provide the required lifting of the service tanks from the ground up against the assembly 32 of FIG. 1.

To empty a service tank, pump 152 pumps water through screen 170, lines 172 and 174, filter 176 and valve 178 into the A connection 76 (there may also be provided an alternate valve 180 and flow control device 182 for use with mixed media service tanks as previously described). The used water resin mix is received through the B connection 78 and valve 184 for dumping into the top of the tank 24 through line 186. For refilling with regenerated resin, valves 184 and 178 are closed and valves 188 and 190 are open. This allows the flow of regenerated resin and water from tank 26 through line 192 into the B connection 78, with the water in the tank passing out through the A connection 76 and valve 190 into the top of tank 24. During the last ten seconds or so of the refill cycle, valve 194 is opened to flush the resin from valve 188 to insure proper closure thereof.

Figure 8:
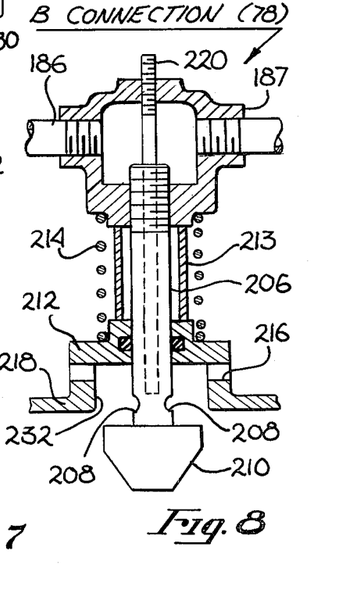
FIG. 8 is a partial cross-sectional view illustrating one possible form for the B connection 78 of the embodiments of FIGS. 2 through 5 for use with a particular type of service tank.

Now referring to FIG. 8, a unique form of connection which may be used with the Rayne and Servisoft type service tank as part of the assembly 32 (FIG. 1) may be seen. The assembly is comprised of a tee member 200 having a cavity 202 therein communicating with two inlet connections 186 and 187 (see FIG. 5 also) and an outlet connection 206. The outlet connection 206 in the preferred embodiment has three holes 208 through the wall thereof just above a plug-like member 210 at the bottom of the connection 206. A flanged member 212 slidably engages connection 206, being limited in travel by member 213 with a coil spring 214 normally encouraging member 212 to the lower position covering the holes 208. Member 212 carries a rubber gasket 216 which is intercepted by the cap area 218 of the service tank when it is lifted into position by the assembly 34 (FIG. 1), thereby lifting member 212 upwardly against the force of the coil spring 214 and projecting plug 210 and holes 208 into the service tank. Thus, in the condition shown in FIG. 8, the inlet connections 186 and 187 are in fluid communication with the internal cavity of the service tank. There is also provided in this assembly, a smaller connection 220 passing through chamber 202 and through a substantial portion of outlet connection 206 to terminate generally adjacent to the holes 208. Of course, this assembly for the Rayne type service tank may comprise the B connection 78 of the various embodiments shown in FIGS. 2 through 5. By way of specific example, referring again to FIG. 5, it will be noted that there is provided in the B connection a line 220 corresponding to connection 220 in FIG. 8, coupled to the pressurized water line received from filter 176 through a valve 230. When the tank has been refilled with resin, B connector 78 is cleaned by closing valves 178 and 190 and opening valves 184 and 230 (or 194 and 230) for approximately ten seconds. This directs water only through connection 220 to cause turbulent flow in the vicinity of holes 208 (see FIG. 8), with the result that the resin generally around the thread area 232 on the service tank is flushed from that region and entrained in the flow-back upward through connection 206 and out through line 204 (line 186 in the more general schematic of FIG. 5). Accordingly, this last portion of the cycle cleans the thread region on the top of the tank to make room for the cap and to provide clean threads for the quick seating thereof.

It should be noted that a service tank such as the tank shown in FIG. 7 may be emptied through the drop tube 58 with relatively high efficiency using a pressure differential in the range of 5 to 15 psi across the resin water mixture. Such a pressure differential encouraging the water and resin mixture to be expelled from the tank may be created by applying a vacuum to the drop tube (or other open connection), and/or applying water or air pressure to one of the other connections on the service tanks. In this pressure range, however, there still is a slightly greater flow of water than resin, so that if a vacuum or air pressure system is used to encourage the flow, it is preferable to also add a small amount of water to one of the other inlet connections, say by way of a small pump pumping from a small water reserve, such as the water at the used resin container, so as to maintain the resin fluid until all resin is exhausted.

Also, it should be noted that while most of the previous description was in relation to systems generally comprising a mixture of resin and water, there are some resins which are not damaged by partially drying, and in fact, will freely flow in the partially dried condition (e.g., without a water carrier) by gravity or other nominal motivating forces. By way of example, Amberlite IR-120PD, manufactured by ROHM and HAAS Company of Philadelphia, Penna. is one such resin. Accordingly, the use of such a resin could have substantial advantages with respect to the present invention. By way of example, the regenerated resin may be partially dried so that the service tanks may be filled with the regenerated resin by gravity, an air ejector, or air pressure, instead of utilizing water as a carrier fluid, thereby substantially reducing the total load which must be carried by the truck or trailer. Similarly, when the used resin is removed from the service tank, the water which is removed with the resin may be drained off in the street, or returned to the tank with the regenerated resin, with the net result that very little water must be carried on the truck or trailer, thereby minimizing the weight of the vehicle, a very highly advantageous result.

Thus, as a variation of one of the previous embodiments, one of the two tanks may in fact be only a form of resin bin, with the second tank serving as the regeneration tank for regenerating overnight. Or, if the resin is removed from the truck or trailer for regeneration in a bulk plant, both of the tanks of the previous embodiments may be replaced with resin bins; one for partially dried regenerated resin and the other for used resin; preferably with the capability of holding a small amount of water in the bottom thereof which may be directed into the service tanks to assure substantially complete removal of the used resin therefrom. It should be noted also, that if the service tanks are filled with regenerated resin which is partially dried and a water carrier fluid is not used for refilling, the service tank will be considerably lighter and easier to handle when returning for reinstallation, with the refilling with water being easily accomplished by the water connections at the installation site and a simple bleed valve for bleeding the air out of the tank as the water is allowed in.

Figures 9A, 9B, 10A, 10B, 11:
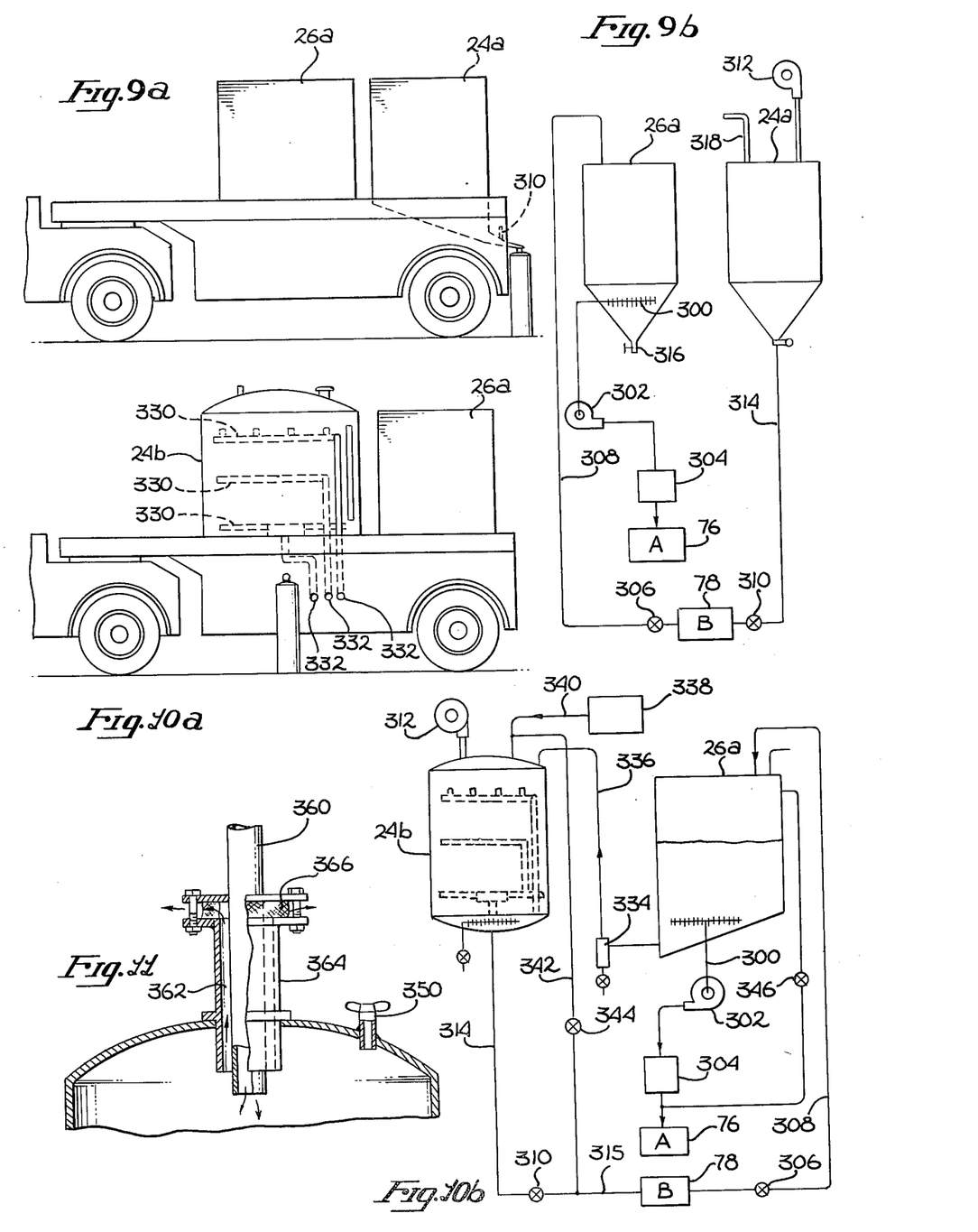
FIGS. 9a and 9b illustrate a fifth embodiment of the present invention.
FIGS. 10a and 10b illustrate a sixth embodiment of the present invention.
FIG. 11 illustrates apparatus for refilling service tanks with regenerated resin and for bleeding the air from refilled service tanks.

In accordance with the foregoing, two additional embodiments are shown in FIGS. 9a and 10a, and schematically in FIGS. 9b and 10b. Thus, in FIGS. 9a and 9b, two resin containers 24a and 26a are provided on a trailer, with container 24a being used to contain regenerated resin and container 26a being used to contain used resin. The used resin container 26a of this embodiment is adapted to hold a small amount of water at the bottom thereof for pumping through the screen intake 300 by pump 302 for delivery through a filter 304 into the A connection 76. At the same time, valve 306 would be opened, whereby the water used resin mix would be delivered from the tank being serviced through B connection 78 and line 308 into the used resin container 26a. For refilling, regenerated resin from container 24a is allowed to pass through a valve 310 into the B connection 78, either by the force of gravity or by additional motivating means such as a blower 312 or an air or water ejector in the delivery line 314. At the end of a run, the used resin may be dumped through doors 316 on the bottom of container 26a for bulk processing overnight, and returned in the partially dried condition to the regenerated storage container 26a through line 318.

In FIGS. 10a and 10b, a system very similar to that just described with respect to FIGS. 9a and 9b is shown. However, in this system, one of the containers, specifically container 24b, is a pressure vessel containing the internal manifolding 330 of conventional design required for regenerating the resin right on the mobile equipment, typically through connections 332 for connection to pumps, water and saline solution sources and the like for the standard refresh cycle. (After the refresh cycle is complete, the water is drained from the tank and blower 312 is used to partially dry the resin.) This embodiment further includes a means for delivering the used resin from the bottom of container 26a into the tank 24b, such as a water injector 334 for delivering the used resin through line 336. There may also be provided a compressor 338 for pressurizing tank 24b through line 340 and for delivering pressurized air through line 342 and valve 334 into line 315. Thus, after the used resin has been removed from the service tank, valves 344 and 346 may be opened so that service tank is pressurized with air through the B connection 78, forcing the water therein out through the A connection 76 and valves 346 into the used resin bin. In this manner, substantially all the water is removed from the service tank so the regenerated resin may be readily delivered thereto, either under the force of gravity or, more particularly, with the additional encouragement of the air pressure in tank 24b. As a result, the service tank is refilled with partially dried regenerated resin (e.g., without any substantial water in the tank) so that the service tank is lighter and more easily returned to the installation. When reconnected to the house, the air in the tank may be expelled by a bleeder valve in the plumbing adjacent the location of the tank connections, or in the alternate, an air bleeder valve such as the valve 350 shown in FIG. 11 may be provided at the top of the service tank. Placement of the valve at the top of the service tank in this manner is preferred over placement of some valve in the plumbing system of the installation, as the valve on the service tank may be added without disturbance of the user's plumbing system.

Also shown in FIG. 11 in partial cross-section is one manner of filling the service tank with regenerated and partially dried resin through a single connection. Thus, by way of example, for Rayne and Servisoft tanks, the regenerated resin may be delivered through a line 360 into the tank, with the air in the tank being expelled through the annular passageway 362 between line 360 and outer housing 364. With a filter 366 being provided to prevent the expulsion of airborne resin particles, the entire assembly is readily removable from the tank for replacement of the plug normally sealing this area of the tank.

There has been described herein various embodiments in the form of alternative embodiments and improvements over the invention of my co-pending application. In particular, these embodiments allow the emptying of the service tank without inversion thereof and the avoidance of any reuse of service tank water if desired. The embodiments further assure the proper closure of the various valves and the easy replacement of the resin in certain types of service tanks by providing special apparatus for the flushing of the valves and port region with water only. While certain specific embodiments have been disclosed and described in detail herein, however, it will be understood by those skilled in the art that various changes in form and detail may further be made without departing from the spirit and scope of the present invention.

I claim:

1. Water conditioning tank service apparatus for removing a granular water conditioning material of a first characteristic from a service tank having at least one service tank connection and refilling the service tank with a granular water conditioning material of a second characteristic comprising:
   engaging means for engaging at least one service tank connection on a service tank for delivering granular material to and from the service tank;
   first tank means for retaining granular material of a first characteristic;
   second tank means for retaining granular material of a second characteristic;
   first flow means coupled between said first tank means and said engaging means for delivering said granular material from said engaging means to said first tank means;
   drive means for encouraging flow in said first flow means of sufficient velocity to remove substantially all of the granular material from a service tank; and
   second flow means coupled between said second tank means and said engaging means for delivering sid granular material from said second tank means to said engaging means to fill the service tank with granular material from said second tank means.

2. The service apparatus of claim 1 further comprised of transport means for transporting the service apparatus to service tank installation sites.

3. The service apparatus of claim 2 wherein said engaging means is a means for coupling said first and second flow means to one service tank connection.

4. The service apparatus of claim 1 wherein said drive means comprises a pump means for reducing the pressure in said first tank means substantially below atmosphere pressure.

5. The service apparatus of claim 4 wherein said drive means comprises an engine driven vacuum pump.

6. The service apparatus of claim 1 wherein said drive means comprises a pump for puming a fluid from one of said first and second tanks, and a fluid operated ejector in said first flow means and coupled to said pump.

7. The service apparatus of claim 1 further comprised of pipe means coupled to said service tank connection and extending into the service tank to a position adjacent the bottom thereof.

8. The service apparatus of claim 7 wherein said pipe means comprises a part of the service tank being serviced.

9. The service apparatus of claim 7, wherein said pipe means is positioned with respect to the service tanks upon the removal of a cap from the service tank.

10. The service apparatus of claim 1 wherein said second flow means includes a flow control valve for stopping the flow of granular material upon the filling of a service tank, and further includes means for flushing granular material from said valve prior to the closure thereof.

11. The service apparatus of claim 1 further comprised of means for flushing granular material from the region of the service tank adjacent said engaging means after the filling of a service tank with granular material.

12. Water conditioning tank service apparatus for removing a granular water conditioning material of a first characteristic and a fluid from a service tank having at least one service tank connection and refilling the service tank with a granular, water conditioning material of a second characteristic comprising:
   engaging means for engging at least one service tank connection for communication with said service tank on a service tank for delivering granular material and fluid from the service tank, and for delivering granular material to the service tank;
   first tank means for retaining grnular material of a first charcteristic;
   second tnk means for retaining granular material of a second characteristic;
   first flow means coupled between said first tank means and said engaging means for delivering granular material and a fluid from said engaging means to said first tank means;
   drive meand for encouraging flow in said first flow means of sufficient velocity to remove substantially all of the granular material from a service tank; and
   second flow means coupled between said second tank means and said engaging means for delivering granular material from said second tank means to said engaging means to fill the service tank with granular material from said second tank means.

13. The service apparatus of claim 12 wherein said second flow means includes a flow control valve for terminating flow in said first flow means upon the filling of the service tank with granular material, and furthe includes means for flushing material from said valve prior to the closure thereof.

14. The service apparatus of claim 12 further comprised of means for flushing granular material from the region of the service tank adjacent said engaging means after the filling of a service tank with granular material.

15. The service apparatus of claim 12 further comprised of transport means for transporting the service apparatus to service tank installation sites.

16. The service apparatus of claim 15 wherein said engaging means is a means for coupling said first and second flow means to one service tank connection.

17. The service apparatus of claim 12 wherein said drive means comprises a pump means for reducing the pressure in said first tank means substantially below atmoshpere pressure.

18. The service apparatus of claim 17 wherein said drive means comprises an engine driven vacuum pump.

19. The service apparatus of claim 12, further comprised of pipe means coupled to said service tank connection and extending into the service tank to a position adjacent the bottom thereof.

20. The service apparatus of claim 19 wherein said pipe means comprises a part of the service tank being serviced.

21. The service apparatus of claim 19 wherein said pipe means is positioned with respect to the service tanks upon the removal of a cap from the service tank.

22. Service apparatus for removing granular material of a first characteristic and a field from a service tank having first and second service tank connections and refilling the tank with a granular material of a second characteristic comprising:
- first and second engaging means for engaging first and second service tank connections, respectively, on a service tank, for delivering granular material and a a fluid to and from the service tank;
- first tank means for retaining granular material of a first characteristic;
- second tank means for retaining granular material of a second characteristic;
- frist flow means coupled between said first tank means and said first engaging means for selectively delivering granular material and fluid from said first engaging means to said first tank means to remove granular material from the service tank;
- second flow means coupled between said second tank means and said first engaging means for selectively delivering granular material and a fluid from said second tank means to said first engaging means to cause granular material to flow into the service tank;
- third flow means coupled between said second engaging means and at least one of said first and second tank means for communicating fluid to and from the second service tank connection; and
- air pressuring means to pressurize one of said first and second engaging means to force fluid out of the service tank.

23. The service apparatus of claim 12 wherein said second flow means includes a flow control valve for stopping the flow of granular material upon the filling of a service tank, and further includes means for flushing granular material from said valve prior to the closure thereof.

24. The service apparatus of claim 12 further comprised of means for flushing granular material from the region of the service tank adjacent said engaging means after the filling of a service tank with granular material.

25. Service apparatus for removing granular material of a first characteristic and a fluid from a service tank having first and second tank connections and refilling said tank with a granular material of a second characteristic comprising:
- first and second engaging means for engaging first and second service tank connections, respectively, on a service tank, for delivering granular material and a fluid to and from the service tank;
- first tank means for retaining granular material of a first characteristic;
- second tank means for retaining granular material of a second characteristic;
- first flow means coupled between said first tank means and said first engaging means for selectively delivering granular material and fluid from said first engaging means to said first tank means to remove granular material from the service tank;
- second flow means coupled between said second tank means and said first engaging means for selectively delivering granular material and a fluid from said second tank means to said first engaging means to cause granular material to flow into the service tank;
- third flow means coupled between said second engaging means and at least one of said first and second tank means, said third flow means being a means for selectively delivering fluid from one of said tank means to said second engaging means, and for selectively delivering fluid from said second engaging means to at least one of said first and second tank means;
- pump means for reducing the pressure in said first tank means substantially below atmospheric pressure for encouraging flow in said first flow means of sufficient velocity to remove substantially all of the granular material from a service tank; and
- transport means for transporting the service apparatus to service tank installation sites.

26. The service apparatus of claim 25 wherein said second flow means includes a flow control valve for stopping the flow of granular material upon the filling of a service tank and further includes means for flushing granular material from said valve prior to the closure thereof.

27. The service apparatus of claim 25 further comprised of means for flushing granular material from the region of the service tank adjacent said engaging means after the filling of a service tank with granular material.

28. Service apparatus for removing granular material of a first characteristic and a fluid from a service tank having first and second tank connections and refilling said tank with a granular material of a second characteristic comprising:
- first and second engaging means for engaging first and second service tank connections, respectively, on a service tank, for delivering granular material and a fluid to and from the service tank;
- first tank means for retaining granular material of a first characteristic;
- second tank means for retaining granular material of a second characteristic;
- first flow means coupled between said first tank means and said first engaging means for selectively delivering granular material and fluid from said first engaging means to said first tank means to remove granular material from the service tank;
- second flow means coupled between said second tank means and said first engaging means for selectively delivering granular material and a fluid from said second tank means to said first engaging means to cause granular material to flow into the service tank;
- third flow means coupled between said second engaging means and at least one of said first and second tank means, said third flow means being a means for selectively delivering fluid from one of said tank means to said second engaging means, and for selectively delivering fluid from said second engaging means to at least one of said first and second tank means,
- a pump and ejector, said pump being coupled to one of said first and second tank means for pumping fluid therefrom, said ejector being coupled to said first flow means and to said pump, said pump and ejector being a means for encouraging flow in said first flow means of sufficient velocity to remove substantially all of the granular material from a service tank; and transport means for transporting the service apparatus to service tank installation sites.

29. The service apparatus of claim 28 wherein said second flow means includes a flow control valve for stopping the flow of granular material upon the filling of a service tank, and further includes means for flushing grandular material from said valve prior to the closure thereof.

30. The service apparatus of claim 28 further comprised of means for flushing granular material from the region of the service tank adjacent said engaging means after the filling of a service tank with granular material.

31. Service apparatus for removing granular material of a first characteristic and a fluid from a service tank having first and second service tank connections and refilling said tank with a granular material of a second characteristic comprising:

first and second engaging means for engaging first and second service tank connections, respectively, on a service tank, for delivering granular material and a fluid to and from the service tank;

first tank means for retaining granular material of a first characteristic;

second tank means for retaining granular material of a second characteristic;

first flow means coupled between said first tank means and said first engaging means for selectively delivering granular material and fluid from said first engaging means to said first tank means to remove granular material from the service tank;

second flow means coupled between said second tank means and said first engaging means for selectively delivering granular material and a fluid from said second tank means to said first tank means to remove granular material from the service tank;

third flow means coupled between said second engaging means and at least one of said first and second tank means, said third flow means being a means for selectively delivering fluid from one of said tank means to said second engaging means; and for selectively delivering fluid from said second engaging means to at least one of said first and second tank means;

means for delivering air under pressure to said second engaging means to encourage flow in said first flow means of sufficient velocity to remove substantially all of the granular material from a service tank; and transport means for transporting the service apparatus to service tank installation sites.

32. The service apparatus of claim 31 wherein said second flow means includes a flow control valve for stopping the flow of granular material upon the filling of a service tank, and further includes means for flushing granular material from said valve prior to the closure thereof.

33. The service apparatus of claim 31 further comprised of means for flushing granular material from the region of the service tank adjacent said engaging means after the filling of a service tank with granular material.

* * * * *